US011681796B2

(12) United States Patent
Tran et al.

(10) Patent No.: US 11,681,796 B2
(45) Date of Patent: Jun. 20, 2023

(54) LEARNING INPUT PREPROCESSING TO HARDEN MACHINE LEARNING MODELS

(71) Applicant: INTERNATIONAL BUSINESS MACHINES CORPORATION, Armonk, NY (US)

(72) Inventors: Ngoc Minh Tran, Dublin (IE); Mathieu Sinn, Dublin (IE); Maria-Irina Nicolae, Dublin (IE); Martin Wistuba, Dublin (IE); Ambrish Rawat, Dublin (IE); Beat Buesser, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 579 days.

(21) Appl. No.: 16/566,862

(22) Filed: Sep. 10, 2019

(65) Prior Publication Data
US 2021/0073376 A1    Mar. 11, 2021

(51) Int. Cl.
*G06F 21/55* (2013.01)
*G06N 20/00* (2019.01)
*G06N 3/082* (2023.01)

(52) U.S. Cl.
CPC ........... *G06F 21/552* (2013.01); *G06N 3/082* (2013.01); *G06N 20/00* (2019.01); *G06F 2221/033* (2013.01)

(58) Field of Classification Search
CPC .................................................... G06F 21/552
See application file for complete search history.

(56) References Cited

U.S. PATENT DOCUMENTS

| 10,230,745 | B2   | 3/2019  | Singh et al. |
|------------|------|---------|--------------|
| 10,248,910 | B2 * | 4/2019  | Crabtree et al. |
| 10,657,259 | B2 * | 5/2020  | Lee ......................... G06N 5/041 |
| 11,132,444 | B2 * | 9/2021  | Carvalho ............... G06N 20/00 |
| 2019/0325163 | A1 * | 10/2019 | Sharad ................ G06F 21/6227 |
| 2020/0143045 | A1 * | 5/2020  | Joye ....................... G06N 20/00 |

OTHER PUBLICATIONS

A. Krizhevsky, G. Hinton. "Learning multiple layers of features from tiny images." Technical report, University of Toronto 1 (4), 2009.
X. Li and F. Li. "Adversarial examples detection in deep networks with convolutional filter statistics." CoRR, 1612.07767, 2016.

(Continued)

*Primary Examiner* — Simon P Kanaan
(74) *Attorney, Agent, or Firm* — Griffiths & Seaton PLLC

(57) ABSTRACT

Various embodiments are provided for securing machine learning models by one or more processors in a computing system. One or more hardened machine learning models that are secured against adversarial attacks are provided by applying one or more of a plurality of combinations of selected preprocessing operations from one or more machine learning models, a data set used for hardening the one or more machine learning models, a list of preprocessors, and a selected number of learners.

17 Claims, 9 Drawing Sheets

(56) References Cited

OTHER PUBLICATIONS

B. Ma, Xingjun andLi, Y. Wang, S. M. Erfani, S. Wijewickrema, G. Schoenebeck, M. E. Houle, D. Song, and J. Bailey. "Characterizing adversarial subspaces using local intrinsic dimensionality." In International Conference on Learning Representations (ICLR), 2018.
R. Feinman, R. R. Curtin, S. Shintre, and A. B. Gardner. "Detecting adversarial samples from artifacts." CoRR, 1703.00410, 2017.
J.H. Metzen, T. Genewein, V. Fischer, and B. Bischoff "On detecting adversarial perturbations." CoRR, abs/1702.04267, 2017.
N. Papemot, P. D. McDaniel, X. Wu, S. Jha, and A. Swami. "Distillation as a defense to adversarial perturbations against deep neural networks." CoRR, abs/1511.04508, 2015.
D. Warde-Farley and I. Goodfellow. "Adversarial perturbations of deep neural networks." In T. Hazan, G. Papandreou, and D. Tarlow, editors, Perturbation, Optimization, and Statistics. 2016.
J. Buckman, A. Roy, C. Raffel, and I. Goodfellow. "Thermometer encoding: One hot way to resist adversarial examples." In International Conference on Learning Representations (ICLR), 2018.
C. Guo, M. Rana, M. Cisse, and L. van der Maaten. "Countering adversarial images using input transformations. In International Conference on Learning Representations" (ICLR), 2018.
G. K. Dziugaite, Z. Ghahramani, and D. M. Roy "A study of the effect of JPEG compression on adversarial images." CoRR, abs/1608.00853, 2016.
W. Xu, D. Evans, and Y. Qi. "Feature squeezing: Detecting adversarial examples in deep neural networks." CoRR, abs/1704.01155, 2017.
X. Madry, A. Makelov, L. Schmidt, D. Tsipras, and A. Vladu. "Towards deep learning models resistant to adversarial attacks." CoRR, abs/1706.06083, 2017.
A. Kurakin, I. J. Goodfellow, and S. Bengio. "Adversarial machine learning at scale." CoRR, abs/1611.01236, 2016.
"Protection Against Adversarial Attacks on Machine Learning and Artificial Intelligence" Authors et. al.: Abhinav Somaraju IP.com Electronic Publication Date: Jan. 29, 2018.
"Predictive Cryptocurrency Mining and Staking" Authors et. al.: Disclosed Anonymously IP.com Electronic Publication Date: Dec. 13, 2017.
"An Exposition of Adversarial Examples in Neural Networks" Di Yang Shi Apr. 2018 (p. 43).
"Adversarial Robustness Toolbox v0.4.0" authors Maria-Irina Nicolae et al. Jan. 11, 2019 (41 Pages).
"Adversarial Machine Learning" Ian Molloy, Mathieu Sinn, and Irina Nicolae ECML/PKDD Sep. 14, 2018 IBM Research AI (114 Pages).

* cited by examiner

LEARNING INPUT PREPROCESSING TO HARDEN MACHINE LEARNING MODELS

BACKGROUND OF THE INVENTION

Field of the Invention

The present invention relates in general to computing systems, and more particularly to, various embodiments for learning input preprocessing to harden machine learning models against adversaries in a computing system using a computing processor.

Description of the Related Art

Computing systems may be found in the workplace, at home, or at school. Due to the recent advancement of information technology and the growing popularity of the Internet, a wide variety of computer systems have been used in machine learning. Machine learning is a form of artificial intelligence that is employed to allow computers to evolve behaviors based on empirical data. Machine learning may take advantage of training examples to capture characteristics of interest of their unknown underlying probability distribution. Training data may be seen as examples that illustrate relations between observed variables. A major focus of machine learning research is to automatically learn to recognize complex patterns and make intelligent decisions based on data.

SUMMARY OF THE INVENTION

Various embodiments for learning input preprocessing to harden machine learning models against adversaries by one or more processors in a computing system, are provided. In one embodiment, by way of example only, a method for learning input preprocessing to harden machine learning models against adversaries in a computing system, again by a processor, is provided. One or more hardened machine learning models that are secured against adversarial systems are provided by applying one or more of a plurality of combinations of selected preprocessing operations from one or more machine learning models, a data set used for hardening the one or more machine learning models, a list of preprocessors, and a selected number of learners.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
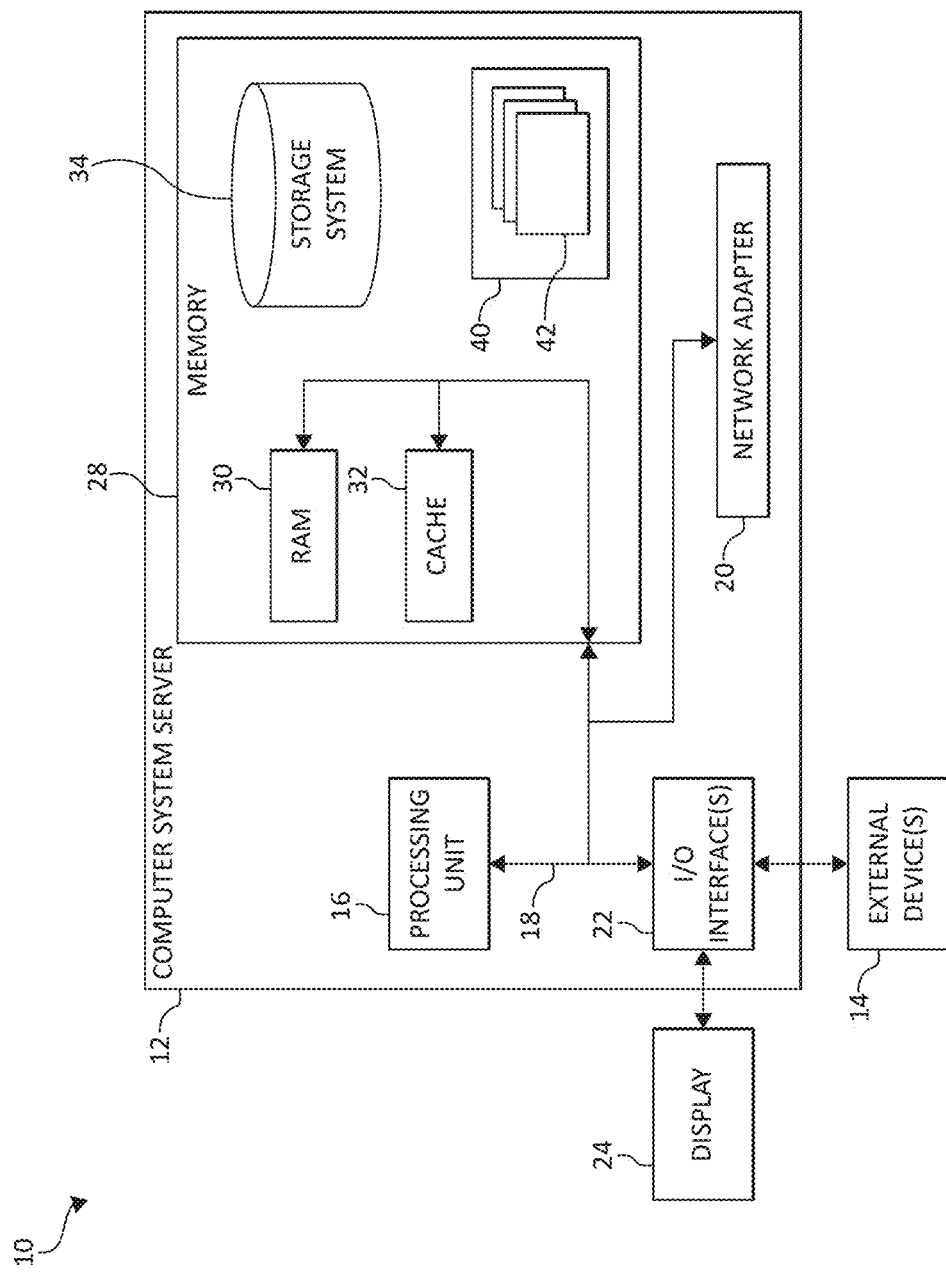
FIG. 1 is a block diagram depicting an exemplary cloud computing node according to an embodiment of the present invention.

The present invention relates generally to the field of artificial intelligence ("AI") such as, for example, machine learning and/or deep learning. Deep-learning refers to a class of machine learning algorithms that are based on the learning of multiple levels of features or representations of a set of data. Current deep-learning methods include using a cascade of multiple layers of nonlinear processing units for feature extraction and transformation. Feature extraction refers to the process of receiving an initial set of measured data and building derived values (or features) to facilitate subsequent learning and generalization steps. In many cases, higher level features are derived from lower level features to generate a hierarchical representation of the measured data and the derived features.

Moreover, deep learning algorithms are based on distributed representations. Distributed representations operate under the assumption that observed (or measured) data are the result of interactions of one or more factors organized into one or more layers. Conceptually, deep learning introduces an additional assumption that the layers of factors that interact to provide the measured data are representative of levels of abstraction or composition. Under this assumption, multiple layers and layer sizes correspond to different amounts of abstraction.

Overall, deep learning has led to major advances in optimizing decision making and extracting business value from unstructured data such as, for example, images, audio, videos and texts. However, while deep learning achieves increased computing performance on a wide variety of data types and tasks, some challenges, weakness, and/or security issues of Deep Neural Networks (DNNs) exists. For example, DNNs are susceptible to adversarial attacks where an adversary can completely alter the behavior of the DNN by making imperceptible changes to its inputs. Moreover, adversaries/adversarial systems (e.g., which may implement an adversarial attack) may also be mounted in the physical world posing a real threat to the deployment of AI and Deep Learning specifically in security-critical applications such as, for example, biometrics, cybersecurity, autonomous vehicles, robotics, etc. Therefore, protecting and securing machine learning/deep learning against adversarial samples are essential to ensure the safe deployment of AI and DL in real-world security-critical applications and, more broadly, sustain trust in AI systems.

Accordingly, various embodiments are provided herein for learning input preprocessing to harden machine learning models against adversaries/adversarial systems in a computing system. One or more hardened machine learning models that are secured against adversaries/adversarial systems (e.g., adversarial attacks) are provided by applying one or more of a plurality of combinations of selected preprocessing operations from one or more machine learning models, a data set used for hardening the one or more machine learning models, a list of preprocessors, and a selected number of learners. In one aspect, adversaries/adversarial systems may be any system, application, process, operation, or other I/O that challenges or compromises the integrity or processing intent of the ML system or intentionally or unintentionally manipulates or the ML system without authorization or approval. Simply stated, the adversaries/adversarial systems may be undetected by the machine learning system and may intentionally or unintentionally cause the machine learning to make a mistake or error.

In one aspect, machine learning models hardening operations may include causing machine learning models to become more robust against adversarial perturbations either by augmenting training data, preprocessing the input data, and making changes to the machine learning model architecture or training algorithms, or a combination thereof. In one aspect, preprocessing the input data provides for direct integration with a given machine learning model in order to harden the machine learning model and provides fastest adversarial defense operations (e.g., little or no overhead during training/inference). In one aspect, preprocessing input data may be effectively combined with other adversarial defense operations such as, for example, adversarial training or runtime detection. Thus, the present invention provides for combining preprocessing operations in an optimize way in order to increase the machine learning model's capabilities of defense against adversaries/adversarial systems (e.g., adversarial attacks). Accordingly, the present invention provides for systematically and programmatically learn optimal combinations of preprocessing techniques in order to achieve the overall adversarial robustness. In this way, the present invention hardens machine learning models against adversarial challenges and enables deployment of secure machine learning models especially in security-critical applications (e.g., healthcare, insurance, finance, etc.).

In an additional aspect, machine learning models may be hardened against adversaries/adversarial systems comprised of computers, CPUs, GPUs, servers, preprocessors, learners, and neural networks. The present invention may perform one or more of the following steps. In step 1), one or more models to be hardened, data sets to be used for hardening (hardening the machine learning models), a list of preprocessors, and a number of learners to be used may be all be received as input data. In step 2), one or more preprocessor may receive one or more data instances from the data set as input, transform the data instances by applying one or more transformations, and provide the transformed data instances as output. In step 3) one or more trained learners, which defend the hardened machine learning model, may preprocess the machine learning models inputs. In step 4), a hardened machine learning model may be provided/generated as output based on the learned combination of preprocessors. In step 5), a threat scores, describing the performance of the machine learning model hardening, may be determined, computed, and/or reported. It should be noted that the hardening of machine learning models may also be provided in a cloud-based environments as a service.

Also, it should be noted that one or more calculations may be performed using various mathematical operations or functions that may involve one or more mathematical operations (e.g., performing rates of change/calculus operations, solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

In general, as used herein, "optimize" may refer to and/or defined as "maximize," "minimize," or attain one or more specific targets, objectives, goals, or intentions. Optimize may also refer to maximizing a benefit to a user (e.g., maximize a machine learning model benefit). Optimize may also refer to making the most effective or functional use of a situation, opportunity, or resource.

Additionally, "optimize" need not refer to a best solution or result but may refer to a solution or result that "is good enough" for a particular application, for example. In some implementations, an objective is to suggest a "best" combination of preprocessing operations ("preprocessors") and/or machine learning models, but there may be a variety of factors that may result in alternate suggestion of a combination of preprocessing operations ("preprocessors") and/or machine learning models yielding better results. Herein, the term "optimize" may refer to such results based on minima (or maxima, depending on what parameters are considered in the optimization problem). In an additional aspect, the terms "optimize" and/or "optimizing" may refer to an operation performed in order to achieve an improved result such as reduced execution costs or increased resource utilization, whether or not the optimum result is actually achieved. Similarly, the term "optimize" may refer to a component for performing such an improvement operation, and the term "optimized" may be used to describe the result of such an improvement operation.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
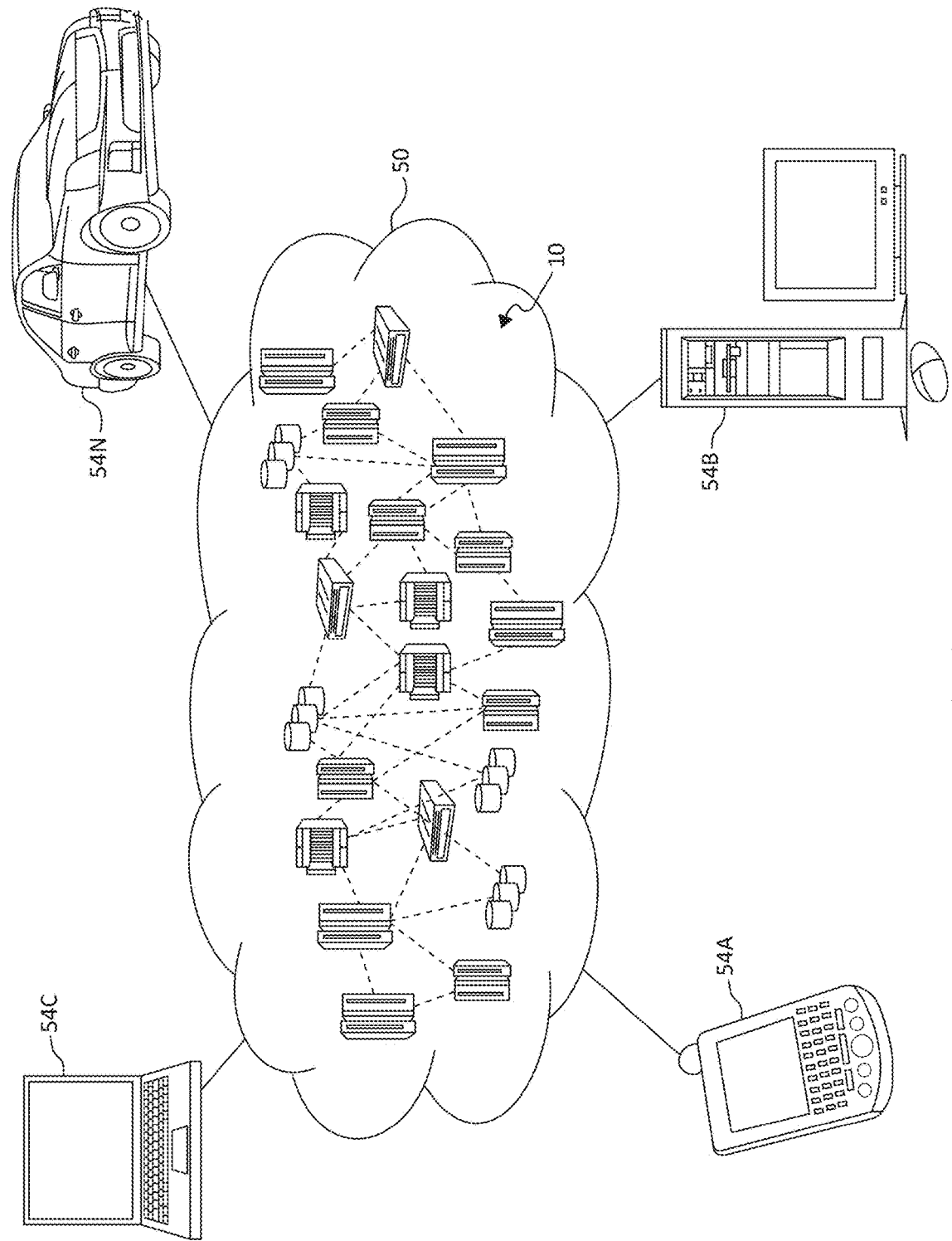
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
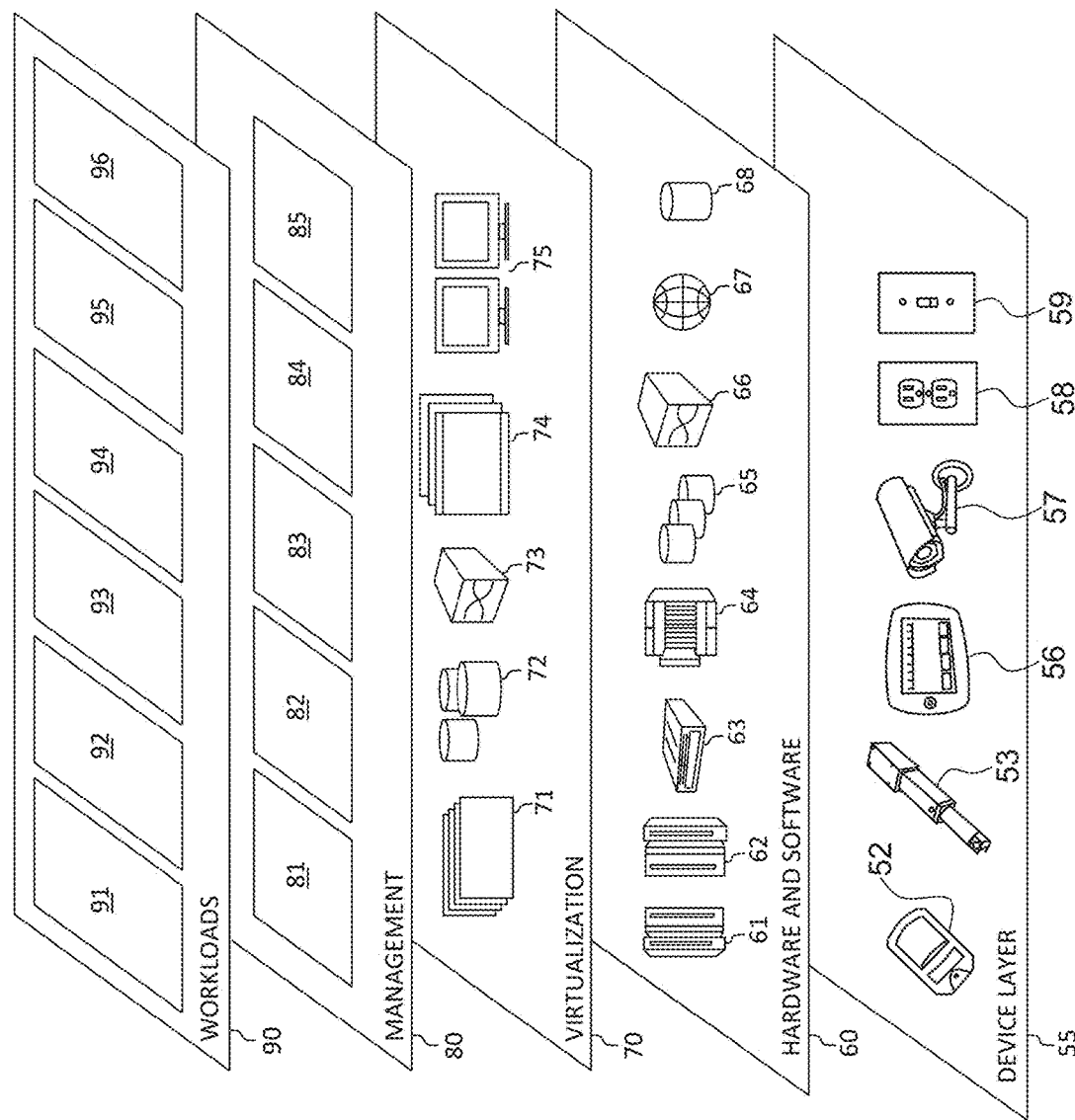
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for learning input preprocessing to harden machine learning models against adversaries/adversarial systems in a cloud computing environment. In addition, workloads and functions 96 for learning input preprocessing to harden machine learning models against adversaries/adversarial systems in a cloud computing environment may include such operations as analytics, deep learning, and as will be further described, user and device management functions. One of ordinary skill in the art will appreciate that the workloads and functions 96 for learning input preprocessing to harden machine learning models against adversaries/adversarial systems in a cloud computing environment may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously stated, the present invention provides novel solutions for providing hardened machine learning models that are secured against adversaries/adversarial systems in a computing system. One or more hardened machine learning models that are secured against adversarial challenges are provided by applying one or more of a plurality of combinations of selected preprocessing operations from one or more machine learning models, a data set used for hardening the one or more machine learning models, a list of preprocessors, and a selected number of learners.

In one aspect, a dataset may be received as input data. A machine learning model that is required to be hardened may be identified. Each of the pre-defined transformers/preprocessors may preprocess a data instance of the dataset without changing the shape of the data instance. The transformed data instances of the data set may be then be classified using the machine learning models, which is now hardened against adversaries/adversarial systems (e.g., adversarial attacks) due to learning the optimal combinations of the pre-defined transformers/preprocessors to use to form the transformed data instances to be classified using the machine learning model needing to be hardened.

For example, assume an image classifier (e.g., a machine learning model) is trained on an image dataset that can easily be attacked (by perturbing its input images) and thus the optimal, learned set of preprocessing operations are used to harden the machine learning model. Each preprocessor (e.g., preprocessing operation) may be a function that takes an image as input (e.g., possibly perturbed image) and produces another image (e.g., possibly partially cleansed image) as output. If the input image is going to be classified by the image classifier (e.g., the machine learning model), the input image shall be preprocessed by one or more data transformers in an optimal, learned set of preprocessing operations before being classified. Thus, the output of one or more transformers of the optimal, learned set of preprocessing operations provides a new image for classification by the machine learning model.

In an additional aspect, input data may be received. The input data may include user specifications indicating a machine learning model to be hardened, a training data set, a set of preprocessors, each of which transforms an input instance of the data set without changing the instances shape, and/or one or more learners. A hardening operation (e.g., an operation for hardening a machine learning models against adversaries/adversarial systems) preprocess the input data set with the set of input preprocessors. During a training period, one or more parameters $W_{ij}$ and a neural network parameters (e.g., Fibre Channel "FC" layers) may be used for training for all learners. At a point in time for testing, the outputs of all learners are combined to harden the machine learning model.

Turning now to FIGS. 4A-4D is a functional block diagram depicting a hardened machine learning model system 400 for exemplary operations for learning input preprocessing to harden machine learning models against adversarial attacks in accordance with some embodiments of the present invention. In one aspect, one or more of the components, modules, services, applications, and/or functions described in FIGS. 1-3 may be used in FIG. 4. As depicted, hardened machine learning model system 400 includes a hardened image classifier 404 (e.g., a machine learning model), which may be included in and/or external to the cloud computing node 10 and/or the computing system 12 of FIG. 1.

The hardened image classifier 404 may include and/or be in communication with one or more preprocessors such as, for example, preprocessor 1-N, one or more learners (e.g., learners 1-m), an image classifier 420, and/or one or more neural networks 430. The image classifier 420 may include one or more machine learning model such as, for example, a convolutional neural network ("CNN"). The one or more neural networks 430 may include one or more FC layers and Logit such as, for example, Logit 1-m.

In general, a machine learning model to be hardened may be any type of machine learning model such as, for example, the CNN, auto-encoders, support vector machine ("SVM"), linear regression, etc. A data set may include unstructured data such as, for example, images, texts, etc. or structured data such as vectors, arrays, etc. The preprocessors such as, for example, preprocessor 1-N may apply one or more transformations to instances such as, for example, an image ("I") 410 of the data set. In one aspect, the transformations may include one or more mathematical functions, signal processing functions, machine learning models, etc. The learners such as, for example, learners 1-m, may be trained by for example iteratively boosting their performance (e.g., using gradient boosting) and at runtime defend the machine learning model (e.g., the CNN) by preprocessing the models inputs.

Accordingly, consider the following operations 415, 425, and 435 illustrated in FIGS. 4A-4D for learning input preprocessing to harden machine learning models against adversarial attacks. As depicted, in both FIGS. 4A-4B, step 1) preprocess input data such as, for example, image ("I") 410. That is, a data instance of a data set such as, for example, the image 410 may be received as input. Using a preprocessing function, the image may be provided to (e.g., pass through) a set of preprocessors such as, for example, preprocessor 1-N to clean the image 410. The preprocessors such as, for example, preprocessor 1-N may each output/provide a set of preprocessed images such as, for example, images $I_1$, $I_2$, and $I_n$.

Figure 4A:
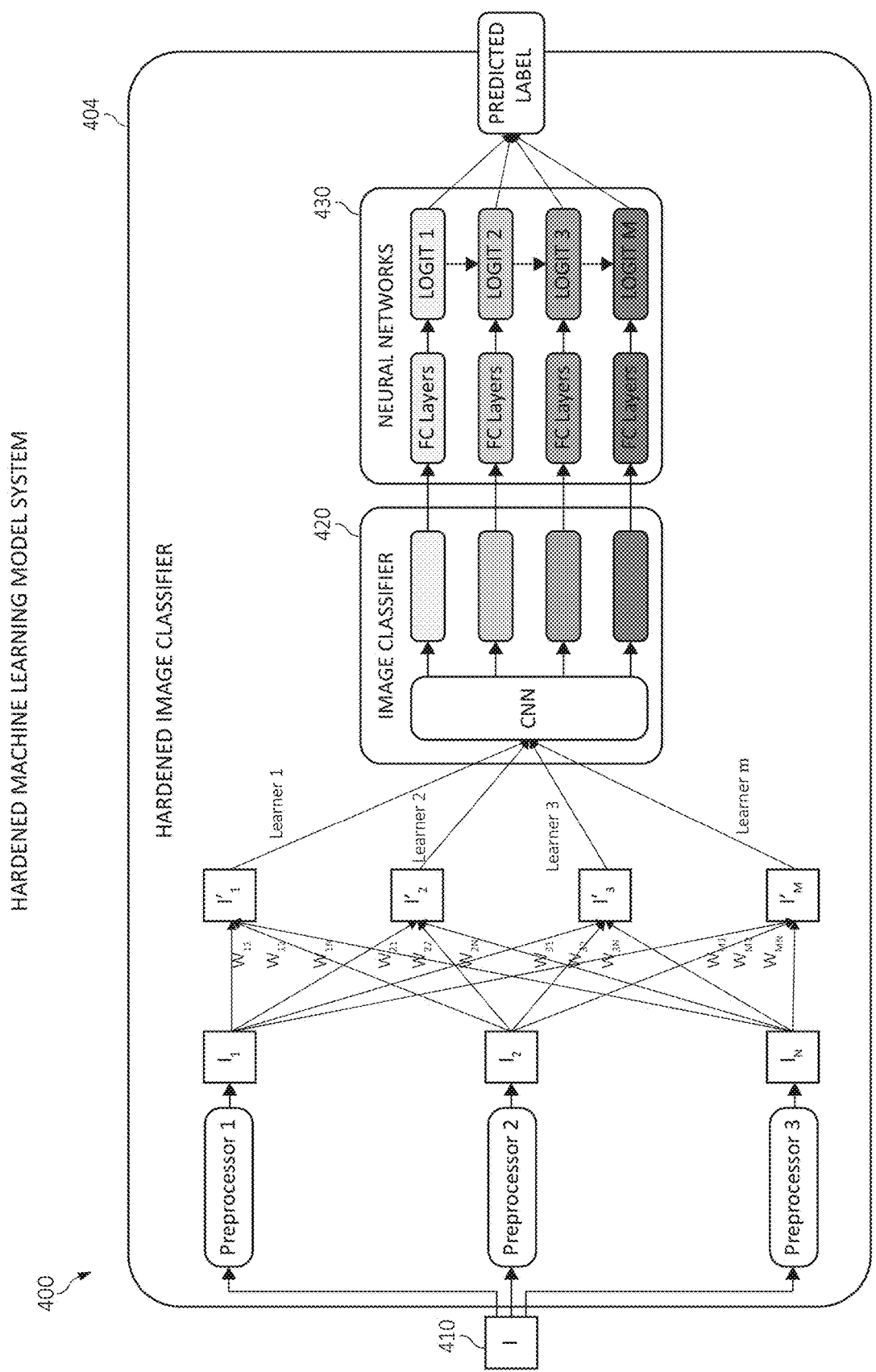
FIG. 4A-4D are block diagram depicting exemplary operations for learning input preprocessing to harden machine learning models against adversarial systems in accordance with another embodiment of the present invention.
Figure 4B:
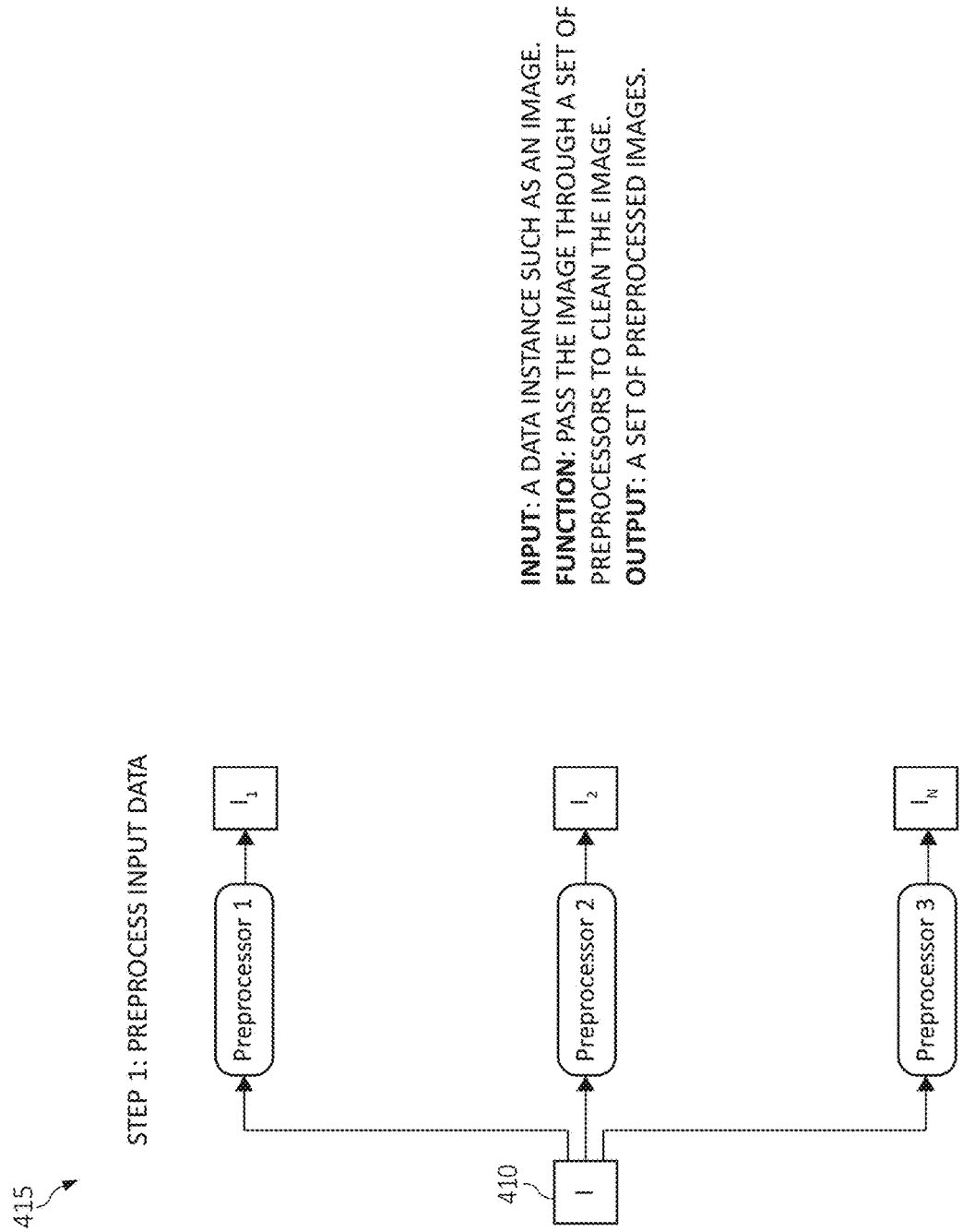
Figure 4C:
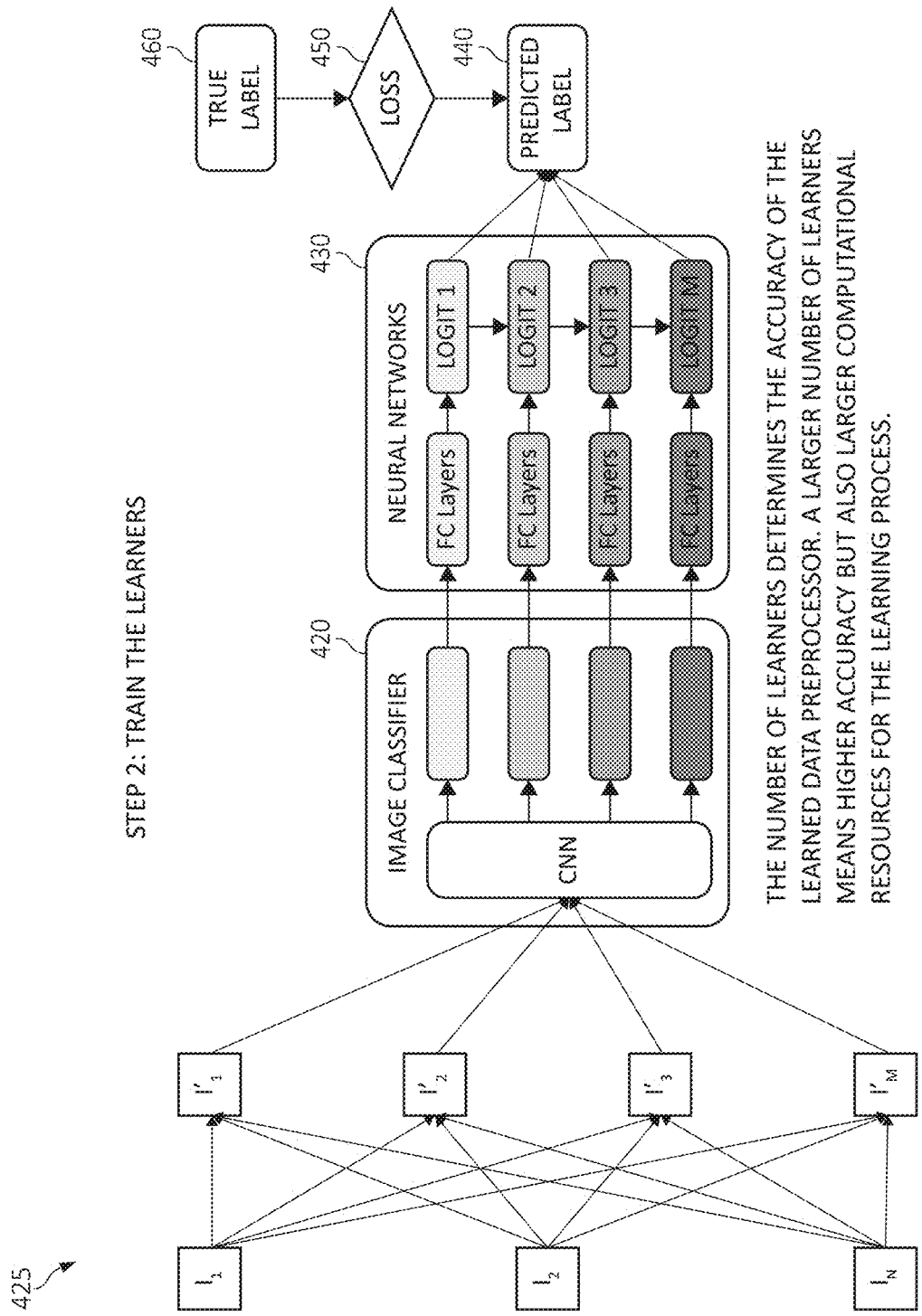

In step 2), as illustrated in FIGS. 4A and 4C, one or more learners (e.g., learners 1, 2, 3, and M) may be trained. The number of learners determines the degree of accuracy of the learned data preprocessor. A larger number of learners may indicate an optimal or increased/higher degree of accuracy but also larger computational resources for the learning process.

For example, using the images (e.g., the set of preprocessed images from Step 1) such as, for example, images $I_1$, $I_2$, and $I_n$ as input, a learning function may be executed to train the parameters for one or more of the learners in sequence as follows. First, x parameters $W_{ij}$ and the neural network (NN) parameters for learner 1 with $I_1'$ and Logit 2 as illustrated in equation 1:

$$I_1' = W_{11}I_1 + W_{12}I_2 + \ldots + W_{1n}I_n; \text{ and}$$

Logit 1=Last Layer of NN. (1)

Second, train parameters $W_{2j}$ and the neural network (NN) parameters for learner 2 with $I_2'$ and Logit 2 as illustrated in equation 2:

$$I_2'=W_{21}I_1+W_{22}I_2+\ldots+W_{2n}I_n; \text{ and}$$

$$\text{Logit 2=Logit 1+Last Layer of NN.} \quad (2)$$

Third, train parameters $W_{3j}$ and the neural network (NN) parameters for learner 3 with $I_3'$ and Logit 3 as illustrated in equation 3:

$$I_3'=W_{31}I_1+W_{32}I_2+\ldots+W_{3n}I_n; \text{ and}$$

$$\text{Logit 2=Logit 2+Last Layer of NN.} \quad (3)$$

This pattern may repeat until concluding with all the set of preprocessed images such as, for example, images $I_1$, $I_2$, and $I_n$, until the last learner. Upon conclusion, a set of trained learners such as, for example, learners 1-m.

Figure 4D:
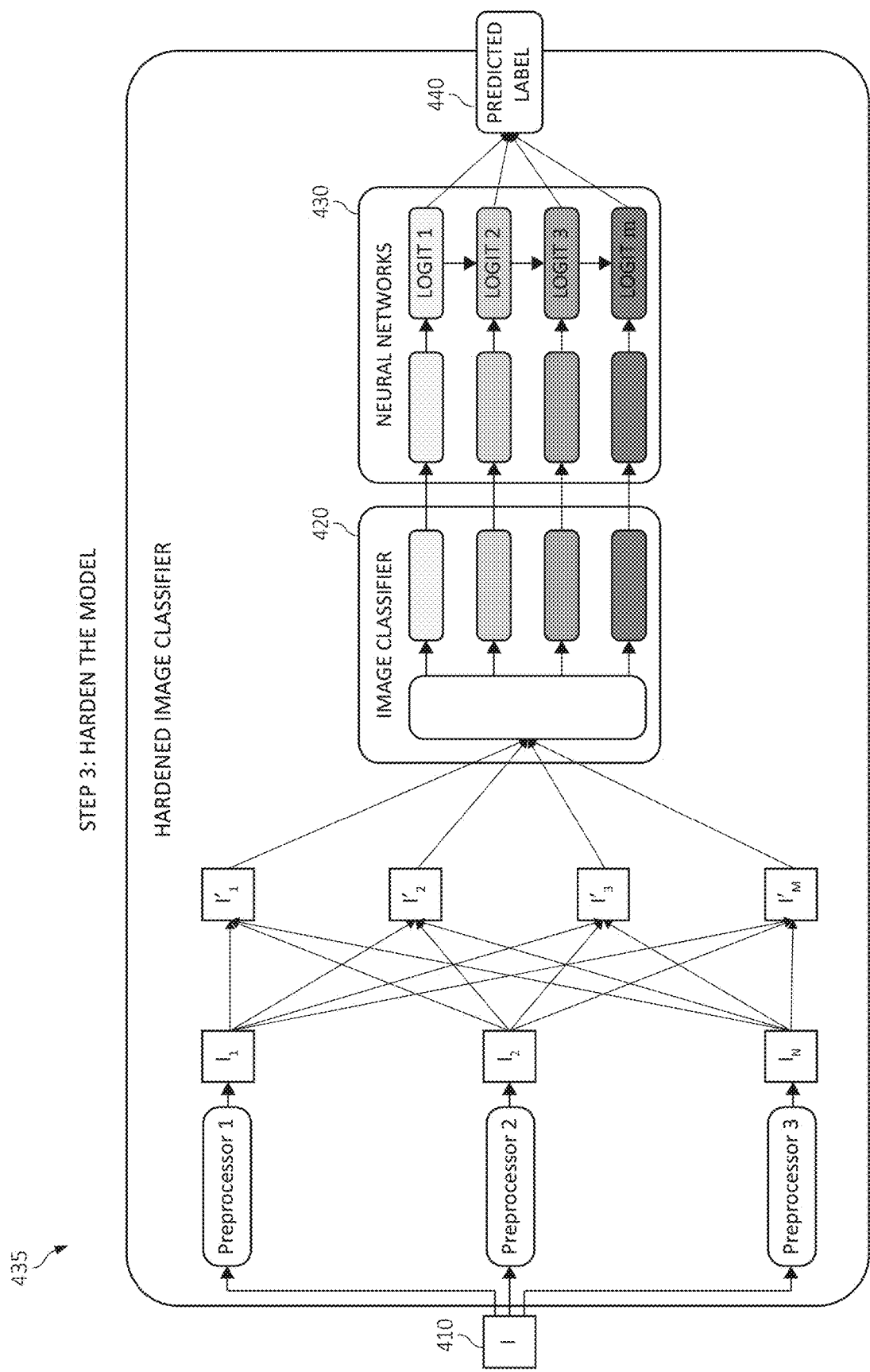

In step 3), as illustrated in FIG. 4D, one or more machine learning models may be hardened. An image 410, to be classified, may be used as input. A hardening function may use the preprocessors and the trained learners, trained from Step 2, to harden one or more machine learning models and classify the image. Thus, the one or more machine learning models may provide as output a predicted label 440. The logit for predicting the label can be obtained at any learner such as, for example, from Logit 1 to Logit m.

Also, as illustrated in FIG. 4C, a determination operation may be performed to identify/determine if any data of the classified image is lost, as in block 450. Also, a true label 460 may be applied and used in block 450.

Figure 5:
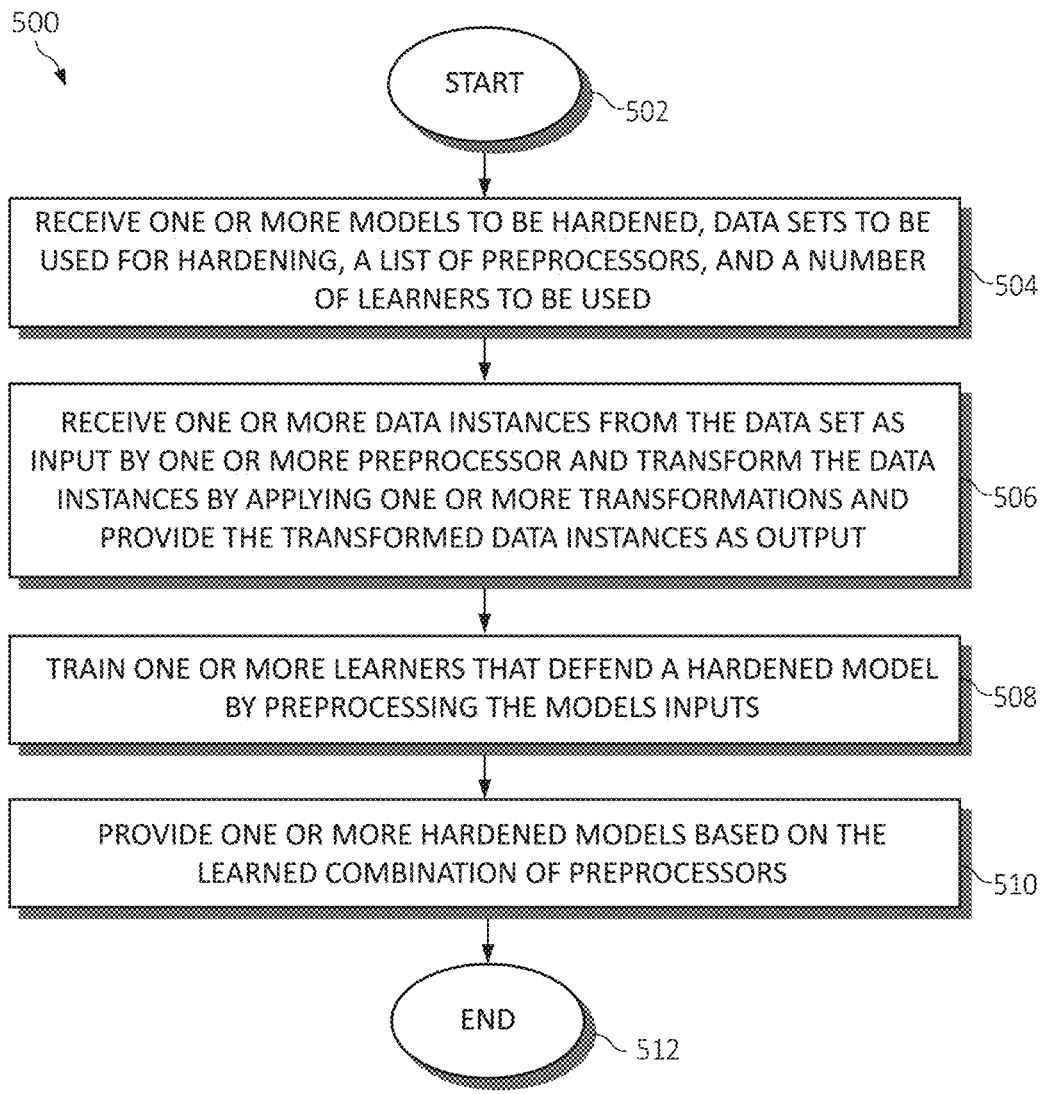
FIG. 5 is a flowchart diagram depicting an exemplary method learning input preprocessing to harden machine learning models against adversaries/adversarial systems in a computing environment by a processor in which aspects of the present invention may be realized.

Turning now to FIG. 5, a method 500 for learning input preprocessing to harden machine learning models against adversarial using a processor is depicted, in which various aspects of the illustrated embodiments may be implemented. The functionality 500 may be implemented as a method executed as instructions on a machine, where the instructions are included on at least one computer readable medium or one non-transitory machine-readable storage medium. The functionality 500 may start in block 502.

One or more models to be hardened, a data set to be used for hardening, a list of preprocessors, and a number of learners to be used may be received, as in block 504. One or more data instances may be received from the data set as input by one or more preprocessors, the data instances may be transformed by applying one or more transformations, and the transformed data instances may be provided as output, as in block 506. One or more learners that defend a hardened model (e.g., hardened machine learning model) by preprocessing the models inputs may be trained, as in block 508. One or more hardened models may be provided based on the learned combination of preprocessors, as in block 510. The functionality 500 may end, as in block 512.

Figure 6:
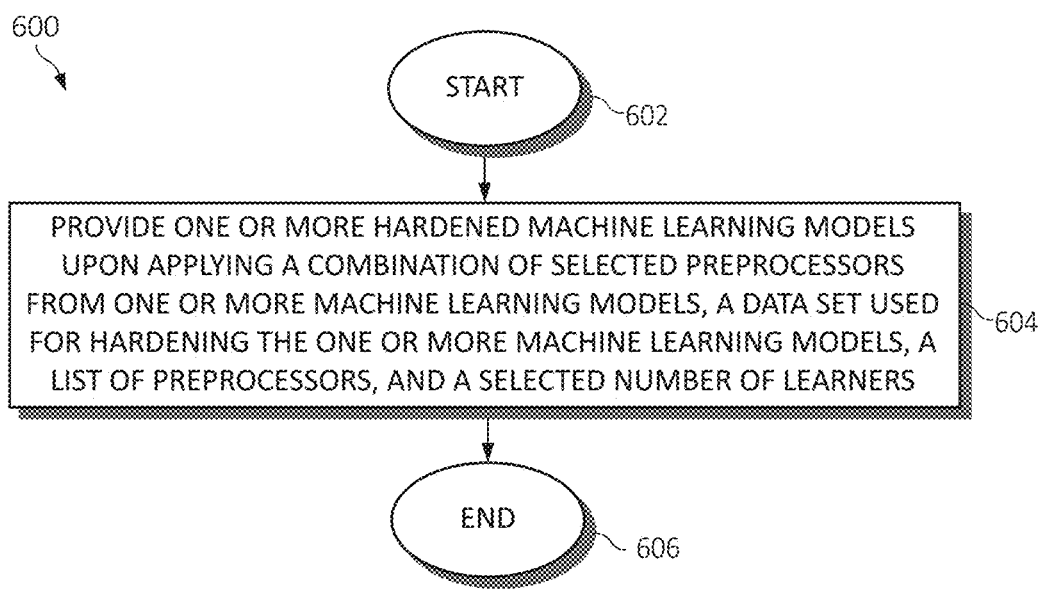
FIG. 6 is a flowchart diagram depicting an exemplary method for learning input preprocessing to harden machine learning models against adversaries/adversarial systems in a computing environment by a processor, in which aspects of the present invention may be realized.

Turning now to FIG. 6, a method 600 for learning input preprocessing to harden machine learning models against adversarial using a processor is depicted, in which various aspects of the illustrated embodiments may be implemented. The functionality 600 may be implemented as a method executed as instructions on a machine, where the instructions are included on at least one computer readable medium or one non-transitory machine-readable storage medium. The functionality 600 may start in block 602.

One or more hardened machine learning models that are secured against adversarial attacks are provided by applying one or more of a plurality of combinations of selected preprocessing operations from one or more machine learning models, a data set used for hardening the one or more machine learning models, a list of preprocessors, and a selected number of learners, as in block 604. The functionality 600 may end, as in block 606.

In one aspect, in conjunction with and/or as part of at least one blocks of FIG. 5 or 6, the operations of 500 and/or 600 may include each of the following. The operations of 500 and/or 600 may receive the one or more machine learning models, the data set used for hardening the one or more machine learning models, the list of preprocessors, and the selected number of learners. The operations of 500 and/or 600 may learn a degree of adversarial robustness of each of the plurality of combinations of selected preprocessing operations.

The operations of 500 and/or 600 may receive one or more data instances from the data set, and/or transform the one or more data instances by applying one or more transformation operations by one or more of the plurality of combinations of selected preprocessing operations.

The operations of 500 and/or 600 may preprocess incoming data using one or more of the plurality of combinations of selected preprocessing operations prior to being consumed by the one or more machine learning models. The operations of 500 and/or 600 may determine a security score for the one or more hardened machine learning models indicating a level of security from the adversarial attacks.

The operations of 500 and/or 600 may learn one or more parameters for each of the selected number of learners, and/or learn each of the plurality of combinations of selected preprocessing operations that harden the one or more machine learning models.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for securing machine learning models in a computing environment by one or more processors comprising:
  receiving, as input, one or more machine learning models, a data set used for hardening the one or more machine learning models, a list of preprocessors, and a selected number of learners trained in sequence;
  providing one or more hardened machine learning models secured against adversarial attacks by applying one or more of a plurality of combinations of selected preprocessing operations from the one or more machine learning models using the input, wherein one of the selected preprocessing operations includes receiving an image of the data set, preprocessing the image by each preprocessor on the list of preprocessors without changing a shape of the image, and outputting a new, cleansed image to subsequently be classified by a classifier of the one or more hardened machine learning models, and wherein a logit for predicting a classification by the one or more hardened machine learning models is obtained from any of the selected number of learners.

2. The method of claim 1, further including learning a degree of adversarial robustness of each of the plurality of combinations of selected preprocessing operations.

3. The method of claim 1, further including:
  receiving one or more data instances from the data set; and
  transforming the one or more data instances by applying one or more transformation operations by one or more of the plurality of combinations of selected preprocessing operations.

4. The method of claim 1, further including preprocessing incoming data using one or more of the plurality of combinations of selected preprocessing operations prior to being consumed by the one or more machine learning models.

5. The method of claim 1, further including determining a security score for the one or more hardened machine learning models indicating a level of security from the adversarial attacks.

6. The method of claim 1, further including:
  learning one or more parameters for each of the selected number of learners; and learning each of the plurality of combinations of selected preprocessing operations that harden the one or more machine learning models.

7. A system for securing machine learning models in a computing environment, comprising:
one or more computers with executable instructions that when executed cause the system to:
receive, as input, one or more machine learning models, a data set used for hardening the one or more machine learning models, a list of preprocessors, and a selected number of learners trained in sequence;
provide one or more hardened machine learning models secured against adversarial attacks by applying one or more of a plurality of combinations of selected preprocessing operations from the one or more machine learning models using the input, wherein one of the selected preprocessing operations includes receiving an image of the data set, preprocessing the image by each preprocessor on the list of preprocessors without changing a shape of the image, and outputting a new, cleansed image to subsequently be classified by a classifier of the one or more hardened machine learning models, and wherein a logit for predicting a classification by the one or more hardened machine learning models is obtained from any of the selected number of learners.

8. The system of claim 7, wherein the executable instructions further learn a degree of adversarial robustness of each of the plurality of combinations of selected preprocessing operations.

9. The system of claim 7, wherein the executable instructions further:
receive one or more data instances from the data set; and
transform the one or more data instances by applying one or more transformation operations by one or more of the plurality of combinations of selected preprocessing operations.

10. The system of claim 7, wherein the executable instructions further preprocess incoming data using one or more of the plurality of combinations of selected preprocessing operations prior to being consumed by the one or more machine learning models.

11. The system of claim 7, wherein the executable instructions further determine a security score for the one or more hardened machine learning models indicating a level of security from the adversarial attacks.

12. The system of claim 7, wherein the executable instructions further:
learn one or more parameters for each of the selected number of learners; and
learn each of the plurality of combinations of selected preprocessing operations that harden the one or more machine learning models.

13. A computer program product for, by a processor, securing machine learning models in a computing environment, the computer program product comprising a non-transitory computer-readable storage medium having computer-readable program code portions stored therein, the computer-readable program code portions comprising:
an executable portion that receives, as input, one or more machine learning models, a data set used for hardening the one or more machine learning models, a list of preprocessors, and a selected number of learners trained in sequence;
an executable portion that provides one or more hardened machine learning models secured against adversarial attacks by applying one or more of a plurality of combinations of selected preprocessing operations from the one or more machine learning models using the input, wherein one of the selected preprocessing operations includes receiving an image of the data set, preprocessing the image by each preprocessor on the list of preprocessors without changing a shape of the image, and outputting a new, cleansed image to subsequently be classified by a classifier of the one or more hardened machine learning models, and wherein a logit for predicting a classification by the one or more hardened machine learning models is obtained from any of the selected number of learners.

14. The computer program product of claim 13, further including an executable portion that:
learns a degree of adversarial robustness of each of the plurality of combinations of selected preprocessing operations; and
determines a security score for the one or more hardened machine learning models indicating a level of security from the adversarial attacks.

15. The computer program product of claim 13, further including an executable portion that:
receives one or more data instances from the data set; and
transforms the one or more data instances by applying one or more transformation operations by one or more of the plurality of combinations of selected preprocessing operations.

16. The computer program product of claim 13, further including an executable portion that preprocesses incoming data using one or more of the plurality of combinations of selected preprocessing operations prior to being consumed by the one or more machine learning models.

17. The computer program product of claim 13, further including an executable portion that:
learns one or more parameters for each of the selected number of learners; and
learn each of the plurality of combinations of selected preprocessing operations that harden the one or more machine learning models.

* * * * *